United States Patent Office 2,822,263
Patented Feb. 4, 1958

2,822,263

METHOD OF EXTRACTING COPPER VALUES FROM COPPER BEARING MINERAL SULPHIDES

Frank Arthur Forward, Vancouver, British Columbia, Canada, assignor to Sherritt Gordon Mines Limited, Toronto, Ontario, Canada, a corporation of Ontario, Canada No Drawing. Application September 1, 1954
Serial No. 453,680

3 Claims. (Cl. 75—117)

This invention relates to a method of extracting copper values from material containing copper. The method is particularly directed to the extraction and recovery of copper from copper bearing mineral sulphides.

This application is a continuation-in-part of my application Serial No. 247,751, filed September 21, 1951.

Pyrometallurgical methods of extracting copper values from copper bearing mineral sulphides are well known and are widely used. In general, such methods involve the steps of smelting the sulphides in an oxidizing atmosphere to reduce the sulphur content and form a matte. The matte is charged into a converter and the residual sulphur is removed to form a crude metal. The crude metal is refined, such as by electrolysis, to form substantially pure copper suitable for casting into commercial shapes. This conventional pyrometallurgical method has the disadvantages of high capital and operating costs and losses of valuable metals in fumes and slags.

Hydrometallurgical methods of extracting copper values from copper bearing ores and concentrates are also known and have been employed in commercial scale operations. Known hydrometallurgical methods for extracting copper values from ores and concentrates have the disadvantages that they are restricted to the treatment of oxidized ores or, in the treatment of sulphide ores, such as leaching in place, they are slow and result in wasteful losses of metal values and reagents. Other known hydrometallurgical methods require a controlled oxidizing and/or reducing roasting operation prior to the leaching step.

It has been found that copper values can be extracted and recovered from copper bearing mineral sulphide ores and concentrates with relatively low capital and operating costs and with a high degree of extractive efficiency by leaching the copper bearing mineral sulphides with a strong aqueous ammonia solution at a temperature and pressure above atmospheric temperature and pressure in the presence of an oxygen bearing, oxidizing gas.

The method of treating copper bearing mineral sulphides of the present invention comprises, in general, the steps of dispersing finely divided copper bearing mineral sulphides in a strong aqueous ammonia solution to form a slurry which contains free ammonia in amount at least sufficient to combine with the copper values to form ammines, actively agitating the slurry in a reaction vessel maintained at a temperature above 80° F. and at a pressure above atmospheric pressure, feeding an oxygen bearing, oxidizing gas into the agitated mixture at a rate sufficient to produce and maintain a partial pressure of oxygen above 5 pounds per square inch whereby copper values in the mineral sulphides are converted to and are dissolved in the aqueous ammonia solution as soluble copper compounds and at least one oxidizable sulphur compound of the group polythionates and thiosulphate is formed in the solution, separating undissolved residue from the copper bearing leach solution, reacting the clarified solution with a free oxygen bearing gas for a period of time sufficient to convert oxidizable sulphur compounds to a sulphur compound of the group ammonium sulphate and ammonium sulphamate, reducing the free ammonia content of the solution, and thereafter reacting the ammoniacal leach solution at elevated temperature and at superatmospheric pressure and under a partial pressure of a sulphur free reducing gas for a period of time sufficient to convert dissolved copper values to and precipitate them from the solution as copper metal powder, and separating precipitated copper metal powder from the solution.

The leaching stage involves the step of dispersing finely pulverized copper bearing mineral sulphides in a strong aqueous ammonia solution. Factors which affect the rate and the efficiency of the extraction of the copper values contained in the mineral sulphides and their dissolution in the leach solution are the size of the mineral sulphide particles, pulp density, or the percentage of solid particles in the mixture, temperature, pressure, agitation, time of retention, and the ammonia and ammonium sulphate concentration.

Copper bearing mineral sulphides to be treated by the method of this invention preferably are finely pulverized. When mixed with the strong aqueous ammonia leach solution to form a slurry, a relatively uniform dispersion of particles in the solution is obtained in which maximum surface area of the particles is exposed to the oxygen-bearing oxidizing gas and the strong aqueous ammoniacal solution. It has been found that while the size of the particles may vary widely, the reaction rate and the extraction of copper values are best when the mineral sulphides are of the order of from about 35 to 325 mesh Standard Tyler screen. Mineral sulphides received from a preliminary concentrating process, such as a flotation process, may be of the order of from about 100 to 325 mesh and can be passed directly into the leaching stage. Mineral sulphides which otherwise have not been reduced in size, can be pulverized, such as by grinding, to about 35 mesh or finer.

The pulp density, or the ratio of solids to solution in the mixture, influences the rate and the efficiency of the extraction. The velocity of extraction is reduced as the pulp density is increased, the maximum pulp density being that at which the mineral sulphide particles can be maintained as a relatively uniform dispersion in the solution. The minimum pulp density is governed by operating economics to obtain maximum extraction of copper values with a reasonable volume of solution. Thus, the pulp density can vary within reasonably broad limits, a very satisfactory range being from about 15% to about 50% solids, depending on the copper content of the solids. This range of pulp densities provides for a rapid rate of extraction of copper values and their dissolution in the leach solution.

The extraction of copper values from copper bearing mineral sulphides by leaching the mineral sulphides with strong aqueous ammonia in the presence of an oxygen bearing, oxidizing gas, such as air, oxygen enriched air or oxygen will proceed over a relatively wide temperature range. The reaction proceeds with progressively increasing rapidity as the temperature is increased above atmospheric temperature, that is above about 80° F. The upper temperature limit is governed by operating economics having regard to the total pressure generated, that is, the pressure generated autogenously at the temperature at which the reaction is conducted plus the pressure of the oxygen bearing, oxidizing gas. A very satisfactory temperature range is from about 100° F. to about 300° F. At temperatures below about 100° F., the time period necessary to obtain maximum extraction of copper values is too long for economic operation and at temperatures above about 300° F. the total pressure is such as to require relatively costly, high pressure reaction vessels.

The leaching stage usually provides the heat necessary for the reaction. If this heat is not sufficient, supplemental heat can be provided by any suitable means. If the autogenous heat of the reaction tends to raise the temperature beyond desired limits, the temperature can be controlled by conventional means, such as by cooling coils.

The total pressure at which the reaction is conducted is the pressure autogenously generated by the temperature plus the partial pressure of the oxygen bearing, oxidizing gas. The oxygen bearing, oxidizing gas can be air, oxygen enriched air or oxygen with or without an inert gas. The gas is, of course, fed into the reaction vessel under pressure. It is preferred to employ a partial pressure of oxygen within the range of from about 5 to about 100 pounds per square inch. A very satisfactory oxygen partial pressure can be obtained by feeding air at about 100 pounds per square inch into the reaction vessel.

If the oxygen bearing, oxidizing gas contains an inert gas, such as nitrogen, as in air, a constant withdrawal of gas from the reaction vessel should be maintained. Withdrawn gas can be passed through a pressure absorption tower wherein ammonia is recovered by washing the gas with water.

The time of retention is determined to obtain maximum extraction of copper values and their dissolution in the leach solution, having regard to the fineness of the particles, the ratio of liquid to solids, the temperature and pressure at which the reaction is conducted, and the agitation. Normally, it is preferred to operate the method under conditions of temperature, pressure and agitation to obtain maximum extraction of copper values, that is from about 96% to about 99% of the copper contained in the mineral sulphides with a time of retention of from 4 to 11 or 12 hours.

The mixture of mineral sulphides and aqueous ammonia solution is agitated sufficiently to maintain a relatively uniform dispersion of particles in the solution to produce maximum dispersion of gas in the liquid and to obtain a high concentration of oxygen at the liquid-solid interface. It is believed that the oxygen present in the gas phase diffuses through the gas-liquid interface into the liquid and in the liquid phase to the surfaces of the mineral sulphide particles. Also, it is possible that copper ions diffuse in the particles to the surfaces where they are converted to copper amines which are soluble in the leach solution. At the same time, oxygen adsorbed on the surfaces of the particles may partially diffuse into the particles to facilitate the extraction of copper values. The extraction of copper values from the mineral sulphides is thus facilitated by the agitation of the mixture.

The operation of the method is very simple. Finely pulverized copper bearing mineral sulphides were dispersed in a strong aqueous ammonia solution, about one part 28% ammonia to two parts water. It is preferred to employ a strong or concentrated aqueous ammonia solution and there must be at least sufficient free ammonia present in the solution to combine with copper values as they are oxidized to form copper amines which are soluble in the leach solution. As excess ammonia is recovered in the solution treatment stages, a substantial excess of ammonia is usually employed in the leaching stage. For example, very satisfactory results are obtained in the use of an ammoniacal solution which contains, during the leaching operation, from 60 to 100 grams of free ammonia per litre. A pulp mixture of mineral sulphides and aqueous ammonia, about 25% solids, by weight, was heated in a reaction vessel for a period of about five hours. The mixture was actively agitated. Air was fed into the reaction mixture and anhydrous ammonia was supplied to maintain a free ammonia concentration of about 90 grams per litre. At the end of the reaction period, it was found that about 95% of the copper had been extracted from the mineral sulphides and dissolved in the leach solution.

The following examples illustrate the operation of the method of the present invention. In each instance a copper sulphide concentrate was employed which had the following average analysis:

| | | |
|---|---|---|
| Cu | percent | 23.22 |
| Zn | do | 4.15 |
| Fe | do | 30.39 |
| S | do | 36.24 |
| Insoluble matter | do | 4.07 |
| Au | oz. per ton | 0.24 |
| Ag | do | 8.20 |

This concentrate was ground to a particle size of about 99.5% minus 325 mesh Standard Tyler screen. Finely pulverized concentrates were charged into a pressure vessel with strong ammonia leach solution which contained about 100 grams of ammonia per litre of solution, to form a mixture containing about 25% solids. The leaching step was conducted at a temperature of about 175° F. and under a pressure of about 90 pounds per square inch, air being employed as the oxygen bearing, oxidizing gas and anhydrous ammonia was continuously supplied to maintain a free ammonia concentration of approximately 90 grams per litre. The leaching stage was continued for about 9 hours after which the mixture was discharged from the reaction vessel and the undissolved residue was separated from the leach solution by filtration.

The following results were obtained:

| Leach solution: | Grams per litre |
|---|---|
| Copper | 39.87 |
| Zinc | 6.80 |
| Sulphur (total) | 50.9 |
| Sulphur as $SO_4$ | 35.7 |
| Sulphur as $S_2O_3$ | 0.21 |
| Sulphur as $S_3O_6$ | 0.13 |
| Ammonia (total) | 114.1 |
| Ammonia (free) | 94.5 |
| $NH_2$ | 7.14 |
| Gold | Trace |
| Silver | Trace |

The term "$NH_3$ free" is defined as $NH_3$ determined by direct titration with sulphuric acid, and the term "$NH_3$ total" includes $NH_3$ free plus the ammonia contained in ammonium compounds.

The residue, after washing, contained about 1.6% copper, about 1.2% zinc, about 52.7% iron, about 0.34 ounce per ton gold and about 11.9 ounces per ton silver. About 97% of the copper and about 90% of the zinc were extracted from the concentrate and dissolved in the leach solution. The iron values contained in the concentrate were converted to a ferric oxide or ferric hydrate which reported in the undissolved residue. Also, substantially all the gold and silver values reported in the residue which was in ideal condition for the recovery of such precious metal values, such as by cyaniding.

The presence of ammonium sulphate in the leach solution expedites the extraction and substantially increases the efficiency of the extraction.

A copper-zinc sulphide concentrate which contained about 24% copper, about 4.5% zinc, about 36% sulphur and about 31% iron was ground to a fineness of about 100% minus 200 mesh. About one part by weight ammonium sulphate to two parts by weight concentrate was mixed with the concentrate. The mixture of concentrate and ammonium sulphate was dispersed in strong aqueous ammonia solution, about 100 grams per litre ammonia, to form a mixture which contained about 25% solids by weight. The leaching stage was conducted at a temperature of about 225° F. and at an oxygen partial pressure of about 20 pounds per square inch above the pressure autogenously generated at the temperature of the reaction for a period of about three hours. At the end of the three hour leaching period, it was found that about 97.3% of the copper, about 94% of the zinc and about 72% of the sulphur had been extracted from the mineral sulphides and had dissolved in the leach solution. About 95% of the copper was recovered with a leaching period of five hours without added ammonium sulphate.

It is possible to conduct the leaching stage in a plurality of steps with the leach solution flowing in counter-current to the flow of mineral sulphides. Fresh mineral sulphides and leach solution from a preceding step are charged into and pregnant leach solution containing dissolved metal values is discharged from the first step and partially leached mineral sulphides and fresh leach solution are charged into and undissolved residue is discharged from the final step. Partially leached mineral sulphides are passed in sequence from the first step to the final step from which, after washing, they are finally discharged to waste or passed to subsequent treatment for the recovery of undissolved metal values. Leach solution is passed in countercurrent to the flow of mineral sulphides from the final step to the first step from which it is discharged in ideal condition for treatment for the recovery of dissolved metal values.

The following example illustrates the operation of the method employing a two-stage counter-current flow of solution and solids as described above to produce a pregnant leach solution containing polythionate ions having more than two sulphur atoms in their molecular structure, such as trithionate and tetrathionate, and/or thiosulphate. The ore concentrate contained about 6.5% nickel, about 5.5% copper, about 30% iron, about 30% sulphur and about 25% insoluble matter. The concentrate was ground to about 80% minus 200 mesh Standard Tyler screen. The pulverized concentrate was charged into the first stage wherein it was retained for about four hours at a temperature of about 175° F. and at a pressure of about 100 pounds per square inch. Undissolved residue was separated from the pregnant leach solution and passed to the second stage wherein it was retained for about 12 hours at a temperature of about 180 °F. and a pressure of about 110 pounds per square inch. Undissolved residue from the second stage was separated from the solution and discharged from the process. Leach solution from the second stage was passed to the first stage. A free ammonia concentration of about 90 grams per litre was maintained throughout both leaching stages. Air was fed into the second stage and passed to the first stage. Ammonia was separated from the gas discharged from the first stage and re-used in the leaching operation.

Pregnant leach solution discharged from the first stage contained:

| | Grams per litre |
|---|---|
| Nickel | 22 |
| Copper | 18 |
| Sulphur (total) | 85.5 |
| Sulphur as sulphate | 52.0 |
| Sulphur as thiosulphate | 6.5 |
| Sulphur as thionate | 10.3 |
| Ammonia (total) | 145 |
| Ammonia (free) | 90.0 |
| $NH_2$ | 8.1 |

About 90% of the nickel, about 91% of the copper and about 75% of the sulphur were extracted from the ore concentrate and dissolved in the solution.

This method of leaching has the advantage that the concentration of metal values in the leach solution can be closely controlled safely below a predetermined maximum at which there would be undesired precipitation of metal values in pipe lines, filters, pumps and like apparatus.

The manner in which leach solution produced in the leaching step and containing dissolved copper values is treated for the recovery of copper substantially free from impurities depends on the manner in which the leaching stage is conducted. Normally, oxidizable sulphur compounds, such as polythionates and thiosulphate, are formed in the early part of the leaching stage. As the leaching period is extended these oxidizable sulphur compounds tend to convert to ammonium sulphate and/or ammonium sulphamate. It is essential that the solution passed to the reduction stage, described in detail hereinafter, be substantially free from oxidizable sulphur compounds, otherwise the copper metal powder precipitated in the reduction stage is contaminated with sulphur to the extent that it does not meet market specifications.

The deleterious effect of and the problem presented by the formation and the presence of oxidizable sulphur compounds in the copper bearing leach solution can be overcome by extending the leaching stage for a period of time sufficient to oxidize the oxidizable sulphur compounds to ammonium sulphate and/or ammonium sulphamate, or, alternatively, by reacting the pregnant leach solution, after separation of undissolved residue, with an oxygen bearing, oxidizing gas, such as air, or oxygen enriched air, for a period of time sufficient to oxidize the oxidizable sulphur compounds substantially completely.

Thus, the leaching stage can be conducted as a single stage operation which is continued to obtain optimum extraction of copper values from the mineral sulphides and optimum oxidation of oxidizable sulphur compounds. Alternatively, the leaching stage can be conducted in a plurality of steps with the leach solution flowing in countercurrent to the flow of mineral sulphides. This latter modification has the important advantage that the copper content of the solution withdrawn from the first or adjustment leaching stage can be closely controlled and optimum extraction of copper values from the mineral sulphides can be obtained in the final step or steps. Oxidizable sulphur compounds present in the solution can be oxidized to ammonium sulphate and/or ammonium sulphamate after the solution is withdrawn from the leaching stage.

Also, a co-current leaching stage can be employed instead of a countercurrent leach. This technique involves passing the leach solution and mineral sulphides co-currently from one reaction vessel to another using a plurality of steps. The leach is continued until the desired extraction of copper values is obtained and thiosulphate and oxidizable polythionates are oxidized to sulphate and/or sulphamate compounds.

It is found, in the operation of the leaching stage hereinbefore described that values of metals such as copper, nickel, cobalt, zinc and cadmium are extracted from the mineral sulphides and are dissolved in the leach solution. Iron values report in the undissolved residue as ferric oxide or ferric hydrate. Values of metals which are relatively insoluble in the leach solution, such as lead, also report in the residue. Undissolved residue can be separated from undissolved residue such as by filtration.

The pregnant leach solution, after oxidation of thiosulphate and oxidizable polythionate compounds and after separation of undissolved residue, is heated at or near its boiling temperature, to reduce the free ammonia content. Released ammonia can be recovered for re-use in the leaching stage. As the ammonia content is reduced towards a mol ratio of ammonia to copper of about 3.6 to 1, there may be a minor precipitation of basic copper salts. It is desirable to maintain in the solution an ammonium sulphate concentration of from about 200 to about 400 grams per litre. The presence of ammonium sulphate in the solution facilitates and improves the extraction of copper values from the mineral sulphides and also minimizes the precipitation of basic copper salts in the boiling stage. The ammonia content of the solution preferably is reduced until the mol ratio of ammonia to copper reaches about 2.5:1. The solution from this stage is acidified with sulphuric acid until the ammonia to copper ratio is about 2:1. The solution is then passed to the reduction stage wherein the copper values are reduced to and precipitated from the solution as copper metal powder substantially free from impurities. Copper metal powder can be separated from the solution by filtration.

Copper values can be precipitated from an aqueous solution by known methods, such as by cementation or by electrolysis. It has been found, however, that an ammoniacal solution prepared according to the method of the present invention is ideally adapted for reduction and precipitation of dissolved copper values by treating the solution with a sulphur free reducing gas such as, for example, carbon monoxide or, preferably, hydrogen, at a temperature and pressure above atmospheric temperature and pressure.

It is found, when hydrogen is employed as a reducing gas, that very satisfactory results are obtained in the reduction stage by employing an ammoniacal solution in which the ratio of ammonia to copper is about 2 to 1, that is a diammine solution, containing copper as $Cu(NH_3)_2$. Copper values are rapidly reduced to and precipitated from the solution as a fine powder substantially free from impurities at a temperature above about 300° F. and at a partial pressure of hydrogen of about 200 pounds per square inch above the pressure autogenously generated at the temperature at which the reducing reaction is conducted.

In the operation of the reduction stage, ammoniacal solution containing from about 30 to about 60 grams of copper per litre is fed into a reaction vessel adapted to withstand relatively high pressures, such as an autoclave, wherein it is heated to a temperature above about 300° F. and preferably between about 300° F. and 500° F. The solution in the reaction vessel is actively agitated and hydrogen is fed into the reaction vessel in amount sufficient to maintain a partial pressure of hydrogen of above about 100 pounds per square inch and preferably from about 100 to about 500 pounds per square inch. Under these conditions, copper values dissolved in the solution rapidly reduce to and precipitate from the solution as metal powder substantially free from impurities. Factors which effect the precipitation of copper metal powder from ammoniacal solutions by gaseous reduction are temperature, partial pressure of hydrogen, ammonia concentration and ammonium sulphate concentration. The following examples illustrate an influence of these factors:

(1) Effect of temperature on the rate of copper reduction:

Conditions:
  Cu concentration—45 g./l.
  Mol ratio of ammonia to copper=1.9:1.
  Reaction time—1 hour.
  $H_2$ partial pressure—400 p. s. i. g.

| Temperature | Percent Cu precipitated as metallic product |
| --- | --- |
| 300° F | 61.3 |
| 350° F | 81.8 |
| 400° F | 97.3 |

(2) Effect of $H_2$ partial pressure:

Conditions:
  Cu concentration—45 g./l.
  Temperature—400° F.
  Mol ratio of ammonia to copper=1.9:1.
  Reaction time—1 hour.

| Partial Pressure of $H_2$, p. s. i. | Percent Cu precipitated as metallic product |
| --- | --- |
| 100 | 60.5 |
| 200 | 72.3 |
| 300 | 85.0 |
| 400 | 97.3 |

(3) Effect of $NH_3$ concentration:

Conditions:
  Temperature ............................. 350° F.
  Pressure ................................ 300 p. s. i. g. $H_2$.
  Reaction Time .......................... 30 minutes.
  Cu concentration ....................... 45 g./l.
  $NH_3/Cu$ ................................ Variable.
  $(NH_4)_2SO_4$ ............................ Nil.

| $NH_3/Cu$ | Percent Cu precipitated |
| --- | --- |
| No $NH_3$ | 82.3 |
| 0.426 | 91.9 |
| 0.858 | 93.3 |
| 1.288 | 95.5 |
| 1.71 | 96.0 |
| 1.91 | 95.5 |
| 2.12 | 95.5 |
| 2.54 | 78.8 |
| 3.00 | 40.0 |

It is found that maximum reduction is obtained within the prescribed time period when employing an ammonia to copper ratio of about 0.4 to 2.12 mols ammonia per mol copper.

(4) Effect of $(NH_4)_2SO_4$:

Conditions:
  Temperature ....................... 350° F.
  Pressure .......................... 300 p. s. i. g. $H_2$.
  Reaction time ..................... 30 minutes.
  Cu concentration .................. 45 g./l.
  $(NH_4)_2SO_4$ ...................... Variable.

| $(NH_4)_2SO_4$ | $NH_3/Cu$=nil | $NH_3/Cu$=1.7 | $NH_3/Cu$=2.54 |
| --- | --- | --- | --- |
| nil | 82.3% Cu ppted | 96% Cu ppted | 87.8% Cu ppted |
| 50 g./l | 95.6% Cu ppted | 95.6% Cu ppted | 63.1% Cu ppted |
| 350 g./l | 96.0% Cu ppted | 95.1% Cu ppted | 45.6% Cu ppted |

It is found that the effect of ammonium sulphate at ammonia to copper ratios lower than 1.7:1 improves the reduction of copper from ammoniacal solutions whereas the effect is negative at higher ammonia to copper ratios.

It may not be economic to continue the reduction stage below about two grams of copper per litre. Small amounts of residual copper values can be converted to and precipitated from the solution as copper sulphides, such as by treating the solution with hydrogen sulphide. Residual copper values precipitated from the solution as copper sulphides following the reduction stage can be returned to the leaching stage.

Copper metal powder recovered from the reduction stage can be marketed as such or it can be compressed or melted and cast into commercial shapes such as wire bars, cakes and ingots, and marketed as such.

The solution, after separation of dissolved metal values, consists essentially of ammonium sulphate. Crystalline ammonium sulphate can be recovered from this solution by known means, such as by crystallization. A portion of the crystalline ammonium sulphate from this stage can be returned to the leaching stage to facilitate and expedite the extraction of copper values from the mineral sulphides. Residual ammonium sulphate can be marketed as such or can be passed to a regenerator for the recovery of ammonia.

The method of the present invention possesses a number of important advantages. It permits the economic and highly efficient extraction and recovery of copper values from mineral sulphides by an easily conducted sequence of operations. High capital and operating costs and metal losses usually attendant with conventional pyrometallurgical process are avoided. The method has the further important advantage that it can be employed to treat mineral ores and concentrates which contain values of other metals and the method can be modified to provide for the recovery of such other metal values separately from the copper values.

What I claim as new and desire to protect by Letters Patent of the United States is:

1. In a method of producing copper metal powder from copper bearing mineral sulphides in which finely divided copper bearing mineral sulphides are leached with a strong aqueous ammonia leach solution under a partial pressure of oxygen to produce a leach solution which contains dissolved copper values, free ammonia, and at least one oxidizable sulphur compound of the group consisting of polythionates and thiosulphate, undissolved residue is separated from the leach solution and the clarified solution is reacted with a sulphur-free reducing gas to precipitate copper metal powder, the improvement which comprises the step of reacting the clarified copper bearing leach solution prior to reacting it with a sulphur-free reducing gas with an oxygen bearing, oxidizing gas for a period of time sufficient to convert substantially all the oxidizable sulphur compounds to an oxidized sulfur compound of the group consisting of ammonium sulphate and ammonium sulphamate.

2. The method according to claim 1 characterized in that free ammonia is present in the clarified leach solution from the leaching step in excess of about 2 mols of ammonia per mol of dissolved copper and the ammonia to copper ratio is adjusted to about 2 mols of ammonia per mol of copper after the oxidation of oxidizable sulphur compounds and prior to the step of reacting the solution with a sulphur-free reducing gas.

3. The method according to claim 1 characterized in that the clarified leach solution subjected to reaction with an oxygen bearing, oxidizing gas for the oxidation of oxidizable sulphur compounds contains from about 200 to about 400 grams of ammonium sulphate per litre.

References Cited in the file of this patent

UNITED STATES PATENTS

| | | |
|---|---|---|
| 656,544 | Hirsching | Aug. 21, 1900 |
| 699,108 | Hunt | Apr. 29, 1902 |
| 702,047 | Collins | June 10, 1902 |
| 755,302 | Le Sueur | Mar. 22, 1904 |
| 1,226,190 | Cox | May 15, 1917 |
| 1,334,420 | Terry | Mar. 23, 1920 |
| 1,407,324 | Browning | Feb. 21, 1922 |
| 1,461,918 | Laist | July 17, 1923 |
| 1,468,988 | Berthelot | Sept. 25, 1923 |
| 1,686,391 | Muller | Oct. 2, 1928 |
| 1,783,662 | Marx et al. | Dec. 2, 1930 |
| 2,175,132 | Serciron | Oct. 3, 1939 |
| 2,391,540 | Keller | Dec. 11, 1945 |
| 2,576,314 | Forward | Nov. 27, 1951 |
| 2,647,830 | Allen et al. | Aug. 4, 1953 |
| 2,687,953 | Kenny et al. | Aug. 31, 1954 |
| 2,693,404 | Mackiw | Nov. 2, 1954 |
| 2,693,405 | Mackiw et al. | Nov. 2, 1954 |

FOREIGN PATENTS

| | | |
|---|---|---|
| 172 | Great Britain | of 1854 |
| 294,868 | Great Britain | Aug. 2, 1928 |

OTHER REFERENCES

J. of Chem. Education, vol. 6, No. 12, December 1929, pages 2203–2208, "Prep. of Ammonium Polysulfide," by Curtman et al.